United States Patent [19]
Sealby et al.

[11] Patent Number: 5,890,159
[45] Date of Patent: Mar. 30, 1999

[54] DATA TRANSFER MECHANISM BETWEEN DATABASES USING A SEPARATE PIPE AT EACH DATABASE

[75] Inventors: Arthur George Sealby, Sandbach; Lawrence Gregory Griffiths, West Didsbury, both of Great Britain

[73] Assignee: International Computers Limited, London, United Kingdom

[21] Appl. No.: 966,689

[22] Filed: Nov. 10, 1997

[30] Foreign Application Priority Data

Nov. 12, 1996 [GB] United Kingdom .................... 9623472

[51] Int. Cl.⁶ ..................................................... G06F 17/30
[52] U.S. Cl. .............................................. 707/10; 707/102
[58] Field of Search ....................................... 707/10, 102

[56] References Cited

U.S. PATENT DOCUMENTS 4,774,661  9/1988  Kumpati ........................................ 707/3
4,825,354  4/1989  Agrawal et al. ............................ 707/10
5,596,745  1/1997  Lai et al. .................................. 707/103
5,787,300  7/1998  Wijaya ................................. 395/800.01

*Primary Examiner*—Maria N. Von Buhr
*Assistant Examiner*—John C. Loomis
*Attorney, Agent, or Firm*—Lee, Mann, Smith, McWilliams, Sweeney & Ohlson

[57] ABSTRACT

A mechanism is described for transferring data between a pair of relational databases on client and server machines. A client component creates a first pipe in the client, and sends information to a server component, enabling it to create a second pipe in the server. The client component then calls the data unloading utility of the client database, causing it to start to unload the data into the first pipe. The client component then starts up a Send process in the client, which reads data from the first pipe and sends it to the server. At the server, the server component calls the loading utility of the server database, specifying the second pipe as input. As the data arrives at the server, the server component writes it into the second pipe, from where it will be read by the loading utility and written into the server database.

6 Claims, 2 Drawing Sheets

DATA TRANSFER MECHANISM BETWEEN DATABASES USING A SEPARATE PIPE AT EACH DATABASE

BACKGROUND TO THE INVENTION

This invention relates to a data transfer mechanism. The invention is particularly, although not exclusively, concerned with a data transfer mechanism for transferring data between relational databases on client and server machines.

Conventional techniques for transferring data between two relational databases require the data first to be read from the source database into a flat file and then to be transferred from the flat file to the target database. However, a problem with this is that this process tends to be slow, and so can take an excessively long time if large amounts of data are involved.

The object of the present invention is to provide an improved data transfer mechanism.

SUMMARY OF THE INVENTION

According to the invention a computer system comprises a first computer containing a first database, a second computer containing a second database, and a data transfer mechanism for transferring data from the first database to the second database, wherein the data transfer mechanism comprises:

(a) in said first computer, a first pipe, an unloading process for reading data from the first database into the first pipe, and a send process for reading data from the first pipe and sending it to the second computer; and (b) in said second computer, a second pipe, a receiving process for writing data received from the first computer into the second pipe, and a loading process for writing data from the second pipe into the second database.

DESCRIPTION OF AN EMBODIMENT OF THE INVENTION

One embodiment of the invention will now be described by way of example with reference to the accompanying drawings.

Figure 1:
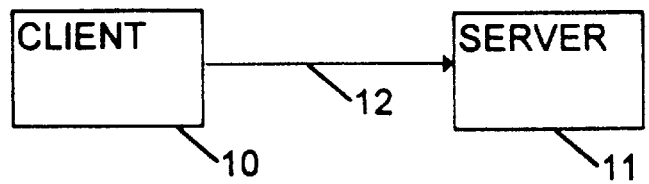
FIG. 1 is a schematic block diagram of a computer system including client and server machines.

Referring to FIG. 1, a computer system comprises a client machine 10 and a server machine 11, connected by a network 12. In the present example, the client and server machines are both UNIX machines. For example, the server machine may be an ICL Goldrush machine. The network may use the standard TCP/IP protocol.

UNIX allows the use of named pipes. A named pipe is a standard UNIX mechanism for redirecting the output of one process to the input of a second process. Pipes are treated as normal files by UNIX: they can be accessed by code using standard IO system calls.

Figure 2:
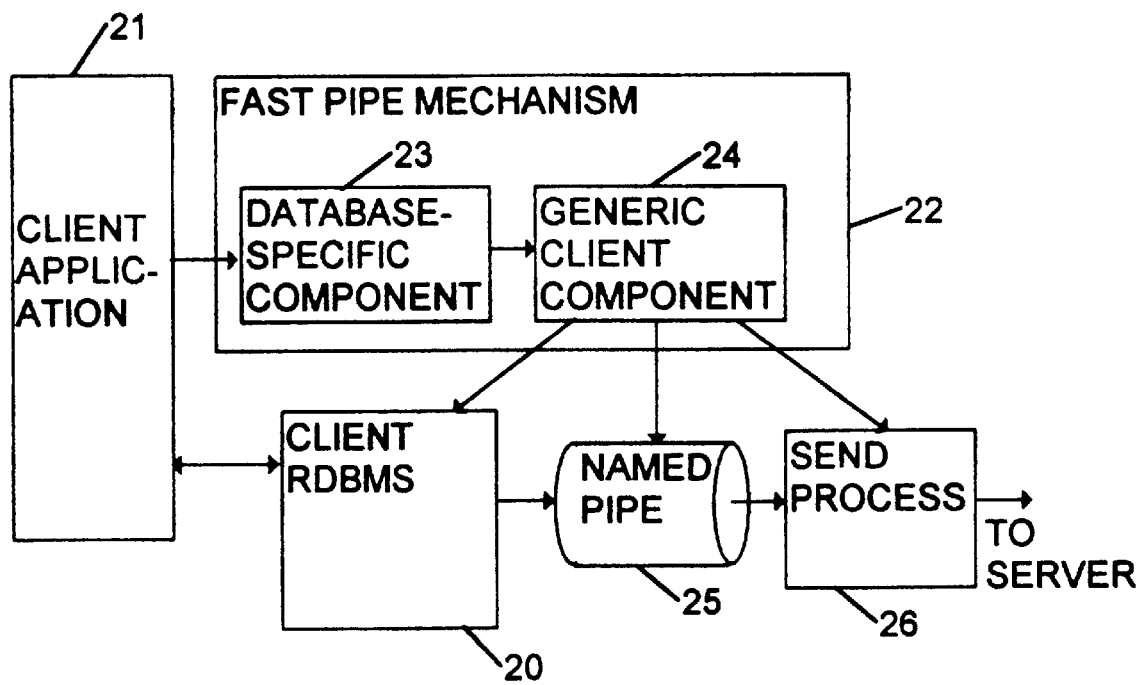
FIG. 2 is a schematic block diagram showing software components running in the client machine.

Referring to FIG. 2, the client machine includes a relational database management system (RDBMS) 20, and a client application 21. The RDBMS may, for example, comprise an Ingres or Oracle database. The client application may be any application which makes use of the RDBMS.

Figure 3:
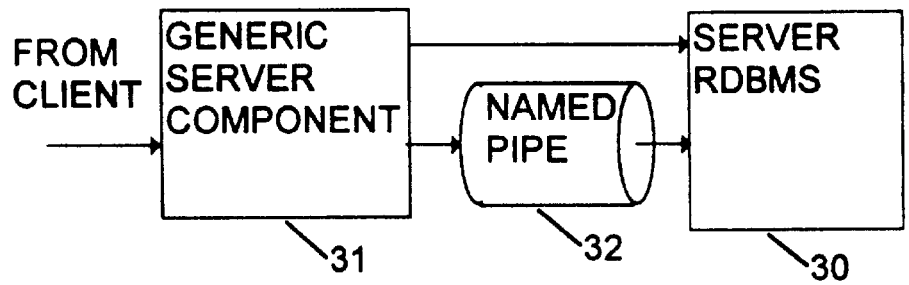
FIG. 3 is a schematic block diagram showing software components running in the server machine.

Referring to FIG. 3, the server machine also includes an RDBMS 30. The server RDBMS 30 may be of the same kind as the client RDBMS 20, or may be different. For example, both may be Ingres databases, or the client RDBMS may be an Ingres database and the server RDBMS may be an Oracle database. It is assumed that it is required to transfer data from the client RDBMS 20 to the server RDBMS 30.

Referring again to FIG. 2, the client machine includes a fast pipe mechanism 22 for efficient transfer of data from the client RDBMS to the server RDBMS. The fast pipe mechanism consists of two components: an database-specific component 23 and a generic client component 24. The database-specific component 23 is specific to the particular client RDBMS, and the client may include several different database-specific components for different RDBMS types. For example, one specific component may be provided for Ingres and another for Oracle. The generic client component 24, on the other hand, is generic to all RDBMS types.

In operation, when the client application 21 requires to transfer data from the client RDBMS to the server RDBMS, it makes a call to the database-specific component 23. The call interface to this component has parameters which are specific to the unloading utilities offered by the client RDBMS and to the loading utilities offered by the server RDBMS. By way of example, the database-specific component specific to Ingres databases provides a command "ingtooracle" for transferring a table from an Ingres database to an Oracle database. This command has the following parameters:

-ppathname

The pathname of the server (i.e. the network address of the server machine).

-srows (Optional) The number of rows from the beginning of the table not to be loaded into the server database. This is useful if it is required to continue a load which has been interrupted for some reason.

-ddirectory (Optional) The name of a directory which holds "copydb" script files.

userid

The username/password of the user performing the load on the server machine.

dbname

The name of the database on the client machine which holds the table to be transferred.

tablename

The name of the table in the specified database which is to be transferred.

The database-specific component validates the parameters of the call, and then constructs a "fastpipe" call to the generic client component 24, containing the following parameters:

-ppathname

The pathname of the server.

-hheader

A header (see below)

-fdata_filename

This specifies the name of a pipe to be used for transferring data from the client database.

-ssql_filename

The name of a file containing an SQL script which may be required by the loading utility in the server.

client_command_line

A command line, for execution by the client.

The header is in "tld" (type, length, data) format, and includes the following information:

A value specifying whether the data to be transferred is formatted or unformatted.

The SQL script filename (if one has been specified). This duplicates the information in the parameter -ssql_filename. A length of 0 indicates that no SQL script is supplied.

A server command line, for execution by the server.

A pipe name for use by the server.

Figure 4:
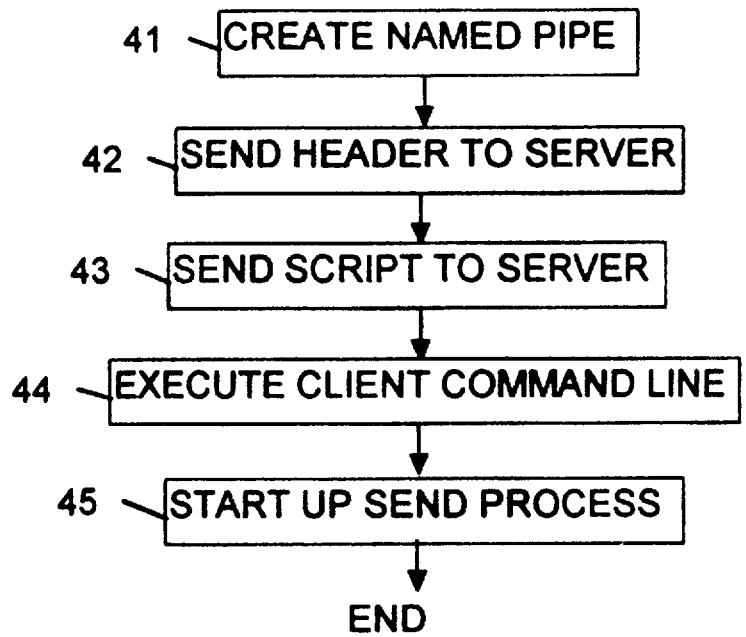
FIG. 4 is a flow chart showing the operation of a generic client component.

When the generic client component receives this call, it performs the following actions as shown in FIG. 4:

(Step 41) The generic client component creates a named pipe 25, with the name -fdata_filename.

(Step 42) The generic client component then sends the header over the network 12 to the server, using the specified -ppathname as the network destination address.

(Step 43) If an SQL script filename has been specified, the generic client component then accesses this script and sends it to the server, immediately after the header.

(Step 44) The generic client component then executes the client command line. This calls the data unloading utility of the client RDBMS, specifying the named pipe 25 as the output file. The unloading utility then starts to unload the required data from the client database and to write it into the named pipe 25.

(Step 45) It starts up a send process 26. This reads the data from the named pipe 25, copies it into a buffer and, when the buffer is full, sends the data over the network to the server.

Figure 5:
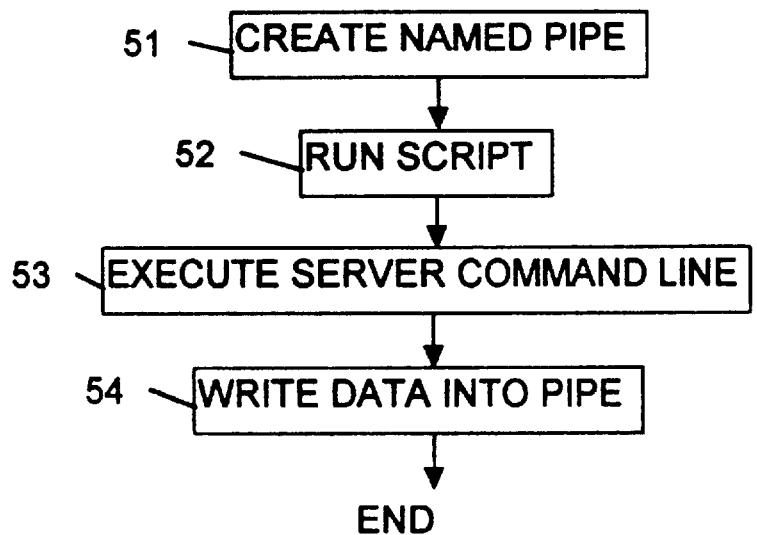
FIG. 5 is a flow chart showing the operation of a generic server component.

Referring again to FIG. 3, the server machine includes a generic server component 31. This receives the header sent by the client, as well as any SQL script, and performs the following actions, as shown in FIG. 5:

(Step 51) The generic server component extracts the pipe name from the header, and uses this to create a named pipe 32.

(Step 52) The generic server component then extracts the SQL script filename (if any) from the header, and uses this to load and run the specified SQL script.

(Step 53) The generic server component then extracts the server command line extracted from the header, and executes it. This calls the data loading utility in the server RDBMS, specifying the named pipe 33 as the input file. In the case where the server RDBMS is an Oracle database, the server command line contains the userid parameter as a password to allow it to access the required tables.

(Step 51) As the data arrives from the network, the generic server component writes this data into the pipe 32. The loading utility will then read this data from the pipe 32 and write it into the database.

It can be seen that the use of the pipes 25, 32 in this way allows the send process 26 to start transferring data over the network as soon as some data is available in the pipe 25, without having to wait for the whole table to be unloaded. Also, the loading process on the remote server machine begins as soon as the pipe 32 receives the first packet of data from the network. Hence, the unloading, transfer and loading processes all proceed simultaneously (or in parallel). This greatly improves the efficiency of the transfer mechanism.

SOME POSSIBLE MODIFICATIONS

It will be appreciated that many modifications may be made to the system described above without departing from the scope of the present invention. For example, compression and decompression techniques may be used in transmitting the data.

What is claimed is:

1. A method of transferring data between a first database on a first computer and a second database on a second computer, the method comprising the steps:

(a) creating a first pipe in said first computer;
   (b) sending a message to the second computer, specifying a second pipe to be created in said second computer
   (c) creating said second pipe in said second computer;
   (d) in said first computer, unloading data from said first database into said first pipe;
   (e) in said first computer, reading data from said first pipe and sending the data to said second computer;
   (f) receiving said data in said second computer, and writing said data into said second pipe; and
   (g) in said second computer, reading data from said second pipe and loading it into the second database.

2. A method according to claim 1, including the further steps:

(a) creating first and second command lines in the first computer;
   (b) causing the first command line to be executed by the first computer, to initiate unloading of data from said first database into said first pipe;
   (c) sending the second command line to the second computer; and
   (d) executing the second command line in the second computer, to initiate loading of data into the second database.

3. A computer system comprising a first computer containing a first database, a second computer containing a second database, and a data transfer mechanism for transferring data from the first database to the second database, wherein the data transfer mechanism comprises:

(a) in said first computer, a first pipe, an unloading process for reading data from the first database into the first pipe, and a send process for reading data from the first pipe and sending it to the second computer; and
   (b) in said second computer, a second pipe, a receiving process for writing data received from the first computer into the second pipe, and a loading process for writing data from the second pipe into the second database.

4. A system according to claim 1 wherein the data transfer mechanism includes:

(a) in said first computer, means for creating first and second command lines, means for causing the first command line to be executed by the first computer, to initiate the unloading process, and means for sending the second command line to the second computer; and
   (b) in said second computer, means for executing the second command line to initiate said loading process.

5. A data processing system comprising a first computer including a first database having a data unloading utility, a second computer including a second database having a data loading utility, and a data transfer mechanism for transferring data from the first database to the second database, wherein the data transfer mechanism comprises:

(a) in the first computer, means for creating a first pipe, means for sending a message to the second computer, specifying a second pipe in said second computer, means for calling said data unloading utility of said first database, specifying the first pipe as an output, and means for starting up a send process in said first computer, to read data from said first pipe and send the data to said second computer; and (b) in said second computer, means responsive to said message, for creating said second pipe in said second computer, means for calling said data loading utility of said second database, specifying the second pipe as an input, and means for receiving said data from said send process and writing said data into said second pipe.

6. A system according to claim 5 wherein the data transfer mechanism includes:

(a) in said first computer, means for creating first and second command lines, means for causing the first command line to be executed by the first computer, to call said data unloading utility, and means for sending the second command line to the second computer; and (b) in the second computer, means for executing the second command line to call said data loading utility.

* * * * *